S. W. Sears.
Lawn-Mower.
Nº 76831. Patented Apr. 14, 1868.

Witnesses:

Inventor:

UNITED STATES PATENT OFFICE.

SAMUEL W. SEARS, OF NEW YORK, N. Y.

IMPROVEMENT IN LAWN-MOWERS.

Specification forming part of Letters Patent No. 76,831, dated April 14, 1868.

*To all whom it may concern:*

Be it known that I, SAMUEL W. SEARS, of the city of New York, in the county and State of New York, have invented a new and Improved Hand Lawn-Mower; and I do hereby declare that the following is a full, clear, and exact description thereof, which will enable others skilled in the art to understand and use the same, reference being had to the accompanying drawings, forming part of this specification, in which—

Figure 1:
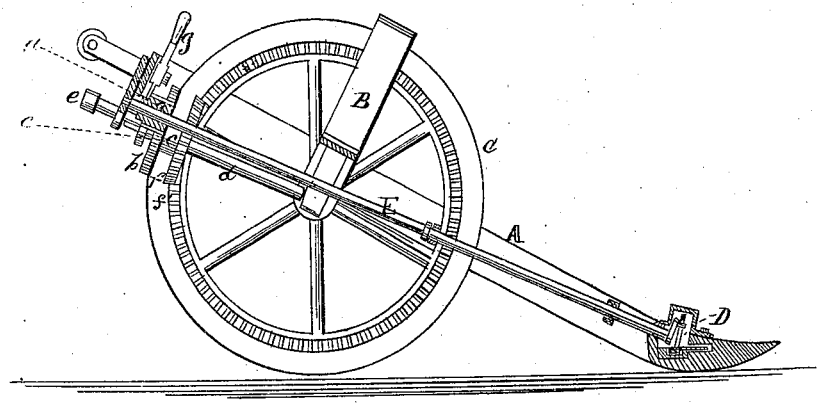
Figure 2:
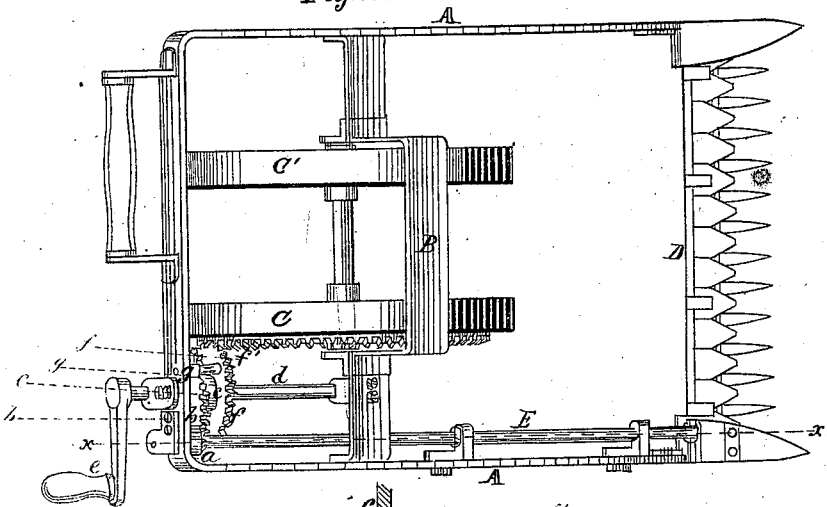
Figure 3:
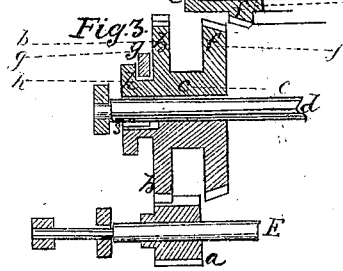

Figure 1 represents a sectional elevation of my improved hand mowing-machine, cut in the plane of the line $xx$, Fig. 2. Fig. 2 represents a plan. Fig. 3 represents an enlarged detached view of the gearing.

Similar letters indicate the same parts in all the drawings.

The object of this invention is to furnish a cheap and convenient instrument for mowing grass smoothly on lawns and flower-bed borders with a reciprocating cutter-bar to be worked by hand.

Only a strong and skillful person can handle a scythe or sickle, as the work is hard and difficult; but with my improved hand-mower a delicate person, and even a lady, can mow a lawn without fatigue, and more neatly than when done with a scythe.

This improvement consists in a light frame mounted upon wheels, or a roller having a cutter-bar in front, to be worked either by pushing from behind or turning a crank, as hereinafter fully described.

The frame A is a narrow and light rectangular form of wood or iron, the sides being connected by a cross-piece, B, in which is hung wheels or rollers C C', large enough to raise the rear of the frame high enough for pushing the machine by a person conveniently.

The cutter-bar D is placed in the front part of the frame, and is designed to be about fifteen inches long, usually, but may be varied in its length, and is constructed with teeth or a serrated edge and guards in the usual way for horse-power mowing-machines.

The cutter-bar is actuated by a long shaft, E, hung in one side of the frame, and connected with it by a cam or crank movement to give the required reciprocation, as shown clearly in Figs. 1, 2.

On the upper end of the shaft E is a pinion, $a$, having long cogs to engage with a shifting gear-wheel, $b$, fixed on a sleeve or sliding hub, $c$, fitted upon a crank-shaft, $d$, one end of which is supported by the cross-piece B, while the other end passes through a bearing in the rear side of the frame, and has a crank, $e$, attached to it. The sleeve $c$ also carries a bevel-wheel, $f$, that engages a bevel-wheel, $f'$, placed on the side of the wheel or roller C and concentric with it. When these bevel-wheels are in gear the sleeve $c$ turns upon the crank-shaft $d$, to give motion to the shaft E, and work the cutter-bar D when the machine is propelled by pushing from behind; but the bevel-wheels $f\,f'$ may be thrown out of gear by slipping the sleeve $c$ up on the crank-shaft, and the sleeve has a recess in it that receives a feather, $s$, Fig. 3, on the crank-shaft, to hold it fast and prevent its turning, in which position it is secured by a locking-bar, $g$, in order that it may turn with the crank-shaft when it is operated by the hand-crank $e$. The locking-bar $g$ catches in a notch or against a shoulder-bearing, $h$, to keep the sleeve from slipping from the feather $s$, as shown clearly in Figs. 1, 3.

When the sleeve $c$ is thus locked upon the crank-shaft $e$ and the bevel-wheels $f\,f'$ are out of gear, the cutter-bar is then operated, while the machine remains stationary, by turning the crank $e$, in order to cut the grass around a plant or in any desired spot.

My improved lawn-mower may thus be operated either when in motion by pushing it forward or when stationary by turning the crank, as desired.

Having described my invention, what I claim, and desire to secure by Letters Patent, is—

In a hand-mover, the combination of the roller or driver C with the concentric gear $f'$ supporting the frame A, the crank-shaft $d$, the shifting sleeve-gear, the shaft E, and the reciprocating cutter-bar D, constructed, arranged, and operating substantially as and for the purposes herein described.

SAM. W. SEARS.

Witnesses:
 L. G. WATSON,
 ELIE BOUIN.